US008583782B2

(12) United States Patent
Park et al.

(10) Patent No.: US 8,583,782 B2
(45) Date of Patent: Nov. 12, 2013

(54) METHOD, SYSTEM AND RECORDING MEDIUM FOR COLLECTING CONTENTS USAGE INFORMATION

(75) Inventors: Kyung Park, Yongin-si (KR); Jongkwan Park, Seongnam-si (KR); Kyoungchan Sohn, Seoul (KR); Sung Kim, Seongnam-si (KR)

(73) Assignee: SK Planet Co., Ltd. (KR)

( * ) Notice: Subject to any disclaimer, the term of this patent is extended or adjusted under 35 U.S.C. 154(b) by 86 days.

(21) Appl. No.: 12/529,265

(22) PCT Filed: Jun. 11, 2008

(86) PCT No.: PCT/KR2008/003244
§ 371 (c)(1),
(2), (4) Date: Aug. 31, 2009

(87) PCT Pub. No.: WO2008/153307
PCT Pub. Date: Dec. 18, 2008

(65) Prior Publication Data
US 2010/0115091 A1   May 6, 2010

(30) Foreign Application Priority Data
Jun. 11, 2007   (KR) .................. 10-2007-0056951

(51) Int. Cl.
*G06F 15/173* (2006.01)
*H04M 11/00* (2006.01)

(52) U.S. Cl.
USPC ........................................ 709/224; 455/405

(58) Field of Classification Search
USPC ......... 709/201–203, 217–219, 223–224, 231; 705/7.29, 7.31, 7.32, 7.33, 7.34, 7.35, 705/14.41, 14.42, 14.43, 14.44, 14.45, 705/26.7; 725/9–21
See application file for complete search history.

(56) References Cited

U.S. PATENT DOCUMENTS

| 2002/0035688 A1 | 3/2002 | Kutaragi et al. |
| 2002/0128984 A1* | 9/2002 | Mehta et al. ................ 705/71 |
| 2004/0103192 A1* | 5/2004 | Yli-Korhonen et al. ...... 709/224 |

(Continued)

FOREIGN PATENT DOCUMENTS

| CN | 1859270 A | 11/2006 |
| JP | 2005-135340 | 5/2005 |
| JP | 2005-228000 | 8/2005 |
| JP | 2005-339732 | 12/2005 |

OTHER PUBLICATIONS

2007 Open Mobile Alliance Ltd., Dynamic Content Delivery Technical Specifications—Session & Transactions, Jun. 2007.

*Primary Examiner* — Shirley Zhang
(74) *Attorney, Agent, or Firm* — Baker Hostetler LLP

(57) ABSTRACT

Disclosed is a method, a system, and a recording medium for collecting content usage information. The method includes the steps of transmitting a usage tracking report message from a DCD client of the terminal to the DCD server; and receiving the usage tracking report message in the DCD server. The usage tracking report message includes first information for identifying a corresponding session, second information including a transaction identifier, third information for identifying a corresponding application, and fourth information including content usage information. Advantageously, the DCD server collects content usage information so that users are provided with highly-preferred contents. The fact that the DCD server collects content usage information and transmits no contents unnecessary to users avoids wasting the network bandwidth and improves content delivery efficiency of the terminals, CP, and DCD server.

25 Claims, 5 Drawing Sheets

(56) References Cited

U.S. PATENT DOCUMENTS

| | | | |
|---|---|---|---|
| 2004/0216171 A1* | 10/2004 | Barone et al. | 725/135 |
| 2005/0235318 A1* | 10/2005 | Grauch et al. | 725/46 |
| 2005/0246282 A1* | 11/2005 | Naslund et al. | 705/52 |
| 2006/0015902 A1* | 1/2006 | Matsuura et al. | 725/46 |
| 2006/0223495 A1* | 10/2006 | Cassett et al. | 455/405 |
| 2007/0192782 A1* | 8/2007 | Ramaswamy | 725/9 |
| 2007/0233571 A1* | 10/2007 | Eldering et al. | 705/14 |
| 2007/0266145 A1* | 11/2007 | Nesbitt et al. | 709/224 |
| 2009/0125773 A1* | 5/2009 | Lee et al. | 714/748 |
| 2010/0070595 A1* | 3/2010 | Park et al. | 709/206 |

* cited by examiner

METHOD, SYSTEM AND RECORDING MEDIUM FOR COLLECTING CONTENTS USAGE INFORMATION

TECHNICAL FIELD

The present invention relates to a method, a system, and a recording medium for collecting content usage information. More particularly, the present invention relates to a method, a system, and a recording medium for collecting content usage information, wherein a DCD server can collect content usage information from a DCD client within a user terminal to provide the user with highly-preferred contents, and delivery of contents unnecessary to the user is excluded to avoid wasting the network bandwidth and improve content delivery efficiency of the terminal, content provider, and DCD server.

BACKGROUND ART

Network infrastructures have recently been expanded, and an increasing number of content providers are producing and storing contents desired by users. Users can visit sites run by such content providers and receive desired contents.

Efficient delivery of contents requires web syndication as a scheme for delivering information produced and modified in real time on the Internet. The web syndication includes, for example, RSS (Really Simple Syndication) and ATOM, which have been proposed and adopted as standards. The RSS and ATOM have made it possible to distribute contents, and contents can be collected more efficiently by a program such as RSS Reader.

However, in mobile environments with comparatively limited resources, access to contents distributed by RSS/ATOM cannot be made in the same manner as in PC environments. In order to solve this problem, a scheme for delivering contents collected for mobile terminals in an optimized manner has been requested, and one of typical examples is DCD (Dynamic Content Delivery), the standardization of which is being conducted by OMA (Open Mobile Alliance).

The DCD seeks to provide mobile terminal users with desired contents in the most efficient manner reflecting the users' preferences. Content delivery schemes for this purpose include a pull scheme employing DCD-1 Interface and a push scheme employing DCD-2 Interface. According to existing mobile services, mobile terminals of users must access sites on the wireless Internet and search a number of depths for desired contents. In contrast, the DCD aims to deliver contents to mobile terminals of users without having to visit and search sites for contents so that users are provided with desired contents that reflect the users' preferences to the greatest extent.

The DCD technology is based on a client server model. Particularly, a DCD server adapted to deliver contents interworks with a DCD client within a terminal, which acts as a client receiving the contents. The DCD technology defines messages exchanged between the DCD server and the DCD client, and specifies a protocol for exchanging contents and messages. In order to deliver contents to the DCD client, the DCD server must receive corresponding contents from the CP (Content Provider) that stores the contents.

However, the conventional DCD technology has a problem in that the DCD server and the CP cannot collect content usage information, i.e. the amount and type of contents used by users. This makes it difficult for the DCD server and the CP to provider users with highly-preferred contents.

The fact that the DCD server and the CP cannot collect content usage information also creates a problem in that users are provided with unnecessary contents.

In other words, the DCD server and CP provide unnecessary contents since they cannot collect content usage information. This wastes the network bandwidth and degrades the content delivery efficiency of the terminals, CP, and the DCD server.

DISCLOSURE

Technical Problem

Therefore, the present invention has been made in view of the above-mentioned problems, and the present invention provides a method, a system, and a recording medium for enabling the DCD server to collect content usage information so that users are provided with highly-preferred contents.

The present invention also provides a method, a system, and a recording medium for enabling the DCD server to collect content usage information and deliver no contents unnecessary to users so that, by avoiding the waste of the network bandwidth, the content delivery efficiency of the terminals, CP, and DCD server is improved.

Technical Solution

In accordance with a first aspect of the present invention, there is provided a method for collecting content usage information in a DCD server from a Terminal, the method including the steps of transmitting a Usage Tracking Report Message from a DCD client of the Terminal to the DCD server; and receiving the Usage Tracking Report Message in the DCD server, wherein the Usage Tracking Report Message includes first information for identifying a corresponding session, second information including a transaction identifier, third information for identifying a corresponding application, and fourth information including content usage information.

The method may further include the steps of transmitting a Usage Tracking Report Request Message from the DCD server to the DCD client of the Terminal; and receiving the Usage Tracking Report Request Message in the DCD client.

According to a second aspect of the present invention, there is provided a system for collecting content usage information in a DCD server from a Terminal, the system including a terminal with a DCD client which transmits a Usage Tracking Report Message; and a DCD server receiving the Usage Tracking Report Message, wherein the Usage Tracking Report Message includes first information for identifying a corresponding session, second information including a transaction identifier, third information for identifying a corresponding application, and fourth information including content usage information.

The DCD server may transmit a Usage Tracking Report Request Message to the DCD client of the Terminal. The DCD client of the terminal may receive the Usage Tracking Report Request Message and transmit the Usage Tracking Report Message to the DCD server based on the received Usage Tracking Report Request Message.

According to a third aspect of the present invention, there is provided a method for collecting content usage information by a terminal so as to collect the content usage information in a DCD server, the method including the steps of generating a Usage Tracking Report Message by a DCD client of the terminal; and transmitting the Usage Tracking Report Message by the DCD client of the Terminal to the DCD server, wherein the Usage Tracking Report Message includes first information for identifying a corresponding session, second information including a transaction identifier, third information for identifying a corresponding application, and fourth information including content usage information.

The method may further include the step of receiving a Usage Tracking Report Request Message transmitted from the DCD server in the DCD client, and the DCD client of the terminal may transmit the Usage Tracking Report Message to the DCD server based on the received Usage Tracking Report Request Message.

According to a fourth aspect of the present invention, there is provided a computer-readable recording medium with a program for realizing a function for collecting content usage information, the computer-readable recording medium including a function for transmitting a Usage Tracking Report Message from a DCD client of the Terminal to the DCD server; and a function for receiving the Usage Tracking Report Message in the DCD server, wherein the Usage Tracking Report Message includes first information for identifying a corresponding session, second information including a transaction identifier, third information for identifying a corresponding application, and fourth information including content usage information.

The computer-readable recording medium may further include a function for transmitting a Usage Tracking Report Request Message from the DCD server to the DCD client of the Terminal; and a function for receiving the Usage Tracking Report Request Message in the DCD client.

In connection with the above-mentioned method, system, and recording medium for collecting content usage information according to the first to fourth aspects of the present invention, the fourth information may include at least one of Content-ID information for identifying a corresponding content, Channel-ID information for identifying a corresponding channel, content usage time information relating to content usage time, and content usage detail information relating to content usage tracking. The content usage time information may include timestamp information regarding when content is first accessed. The content usage detail information may include usage-count information regarding the number of times content is accessed.

In connection with the above-mentioned method, system, and recording medium for collecting content usage information according to the first to fourth aspects of the present invention, the Usage Tracking Report Request Message may include at least one of Session-ID information for identifying a corresponding session, information including Transaction ID information, and Application-ID information for identifying a corresponding application.

DESCRIPTION OF DRAWINGS

The foregoing and other objects, features and advantages of the present invention will become more apparent from the following detailed description when taken in conjunction with the accompanying drawings in which.

MODE FOR INVENTION

Figure 1:
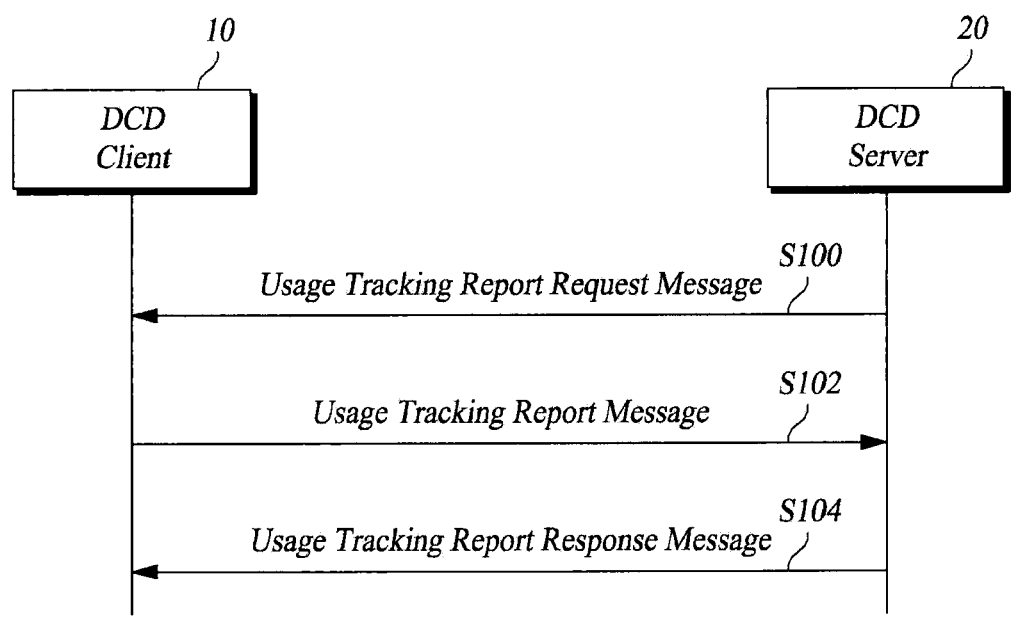
FIG. 1 is a flowchart showing a method for collecting content usage information according to an embodiment of the present invention.

Hereinafter, exemplary embodiments of the present invention will be described with reference to the accompanying drawings. In the following description and drawings, the same reference numerals are used to designate the same or similar components, and so repetition of the description on the same or similar components will be omitted. Furthermore, a detailed description of known functions and configurations incorporated herein is omitted to avoid making the subject matter of the present invention unclear.

FIG. 1 is a flowchart showing a method for collecting content usage information according to an embodiment of the present invention.

Prior to describing a method for collecting content usage information regarding contents used by a user's terminal by a DCD server with reference to FIG. 1, the process of delivering contents to the terminal and expressing (consuming or reading) contents by the terminal will be described briefly.

The process of delivering contents to the terminal and expressing (consuming or reading) the contents by the terminal is as follows: contents are delivered to a DCD client within the terminal through the DCD server from a CP. The DCD client finally delivers the contents to an application pre-installed in the terminal so that the contents are expressed (read) by the application. The contents may be contained in a specific channel.

The user terminal, which receives contents from the DCD server in this manner, includes a DCD client for receiving contents stored in the CP from the DCD server, and an application installed to express the contents received by the DCD clients.

The DCD server 20, which is adapted to collect content usage information according to the present invention, receives contents from the CP, delivers the contents to the DCD client 10 within the terminal, and collects information regarding contents used by the terminal.

The DCD client 10, which is adapted to deliver and report content usage information to the DCD server 20 according to the present invention, acts as a client receiving contents from the DCD server 20 and exists in the terminal. The DCD client 10 incorporates the functions of delivering contents to the application installed inside the terminal so that the contents can be expressed, and transmitting content usage information regarding contents expressed (consumed, read, or used) by the application pre-installed in the terminal to the DCD server 20.

Referring to FIG. 1, an exemplary method for collecting content usage information regarding contents used by a user's terminal from the terminal by a DCD server includes a usage tracking report request step S100, in which the DCD server 20 transmits a usage tracking report request message to the DCD client 10 inside the terminal, a content usage information collection step S102, in which the DCD server 20 receives a usage tracking report message from the DCD client 10, and a content usage information collection termination step S104, in which the DCD server 20 transmits a usage tracking report response message to the DCD client 10.

The method for collecting content usage information will now be described in more detail.

In the content usage information collection notification step S100, in order to collect content usage information, the DCD server 20 notifies the terminal that it will collect content usage information. In this step, the DCD server 20 transmits a usage tracking report request message to the DCD client 10 inside the terminal to notify that the DCD server 20 will collect content usage information regarding contents used by the terminal.

After receiving the transmitted usage tracking report request message, the DCD client 10 reads an application ID, which may be included in the message, and extracts channel usage information, content usage information, etc. regarding contents expressed (read or used) by the application corresponding to the application ID. Then, the DCD client 10 creates a usage tracking report message, which is used in the above-mentioned content usage information collection step S102, and transmits the message to the DCD server 20.

The usage tracking report request message may be transmitted from the DCD server 20 to the DCD client 10 at a cycle or an event period set by the administrator of the DCD server or set in a program regarding content usage information collection within the DCD server. The usage tracking report request message will be described later in more detail with reference to FIG. 2.

In the content usage information collection step S102, the DCD server 20 receives the usage tracking report message from the DCD client 10 and collects content usage information regarding contents used by the terminal.

Particularly, in the content usage information collection step S102, the DCD client 10 reads the application ID, which is included in the usage tracking report request message received in the previous step S100, and extracts channel usage information, content usage information, etc. regarding contents expressed (read or used) by the application corresponding to the application ID. Then, the DCD client 10 creates a usage tracking report message and transmits the message to the DCD server 20, which then receives the message and actually collects content usage information. The usage tracking report message including channel usage information, content usage information, etc. will be described later in more detail with reference to FIGS. 3a, 3b, 3c, and 3d.

In the content usage information collection termination step S104, the DCD server 20 transmits a usage tracking report response message to the DCD client 10 in response to the usage tracking report message created in the preceding content usage information collection step S102, and completes the collection of content usage information from the terminal.

Particularly, in the content usage information collection termination step S104, the DCD server 20 adds result information regarding whether collection of content usage information has been successful or not to the usage tracking report response message and transmits it. If the DCD server 20 successfully collects content usage information from the usage tracking report message, which has been received from the DCD client 10 in the preceding step S102, a specific value indicating successful collection is set in the result information. If the collection has failed, a value corresponding to collection failure or the reason of collection failure is set in the result information. The usage tracking report response message will be described later in more detail with reference to FIG. 4.

In summary, the DCD server 20 notifies the DCD client 10 that it will collect content usage information through the usage tracking report request step S100, and collects content usage information regarding contents used by the terminal from the DCD client 10 through the content usage information collection step S102. Finally, the DCD server 20 transmits the collection result to the DCD client 10 through the content usage information collection termination step S104.

Figure 2:
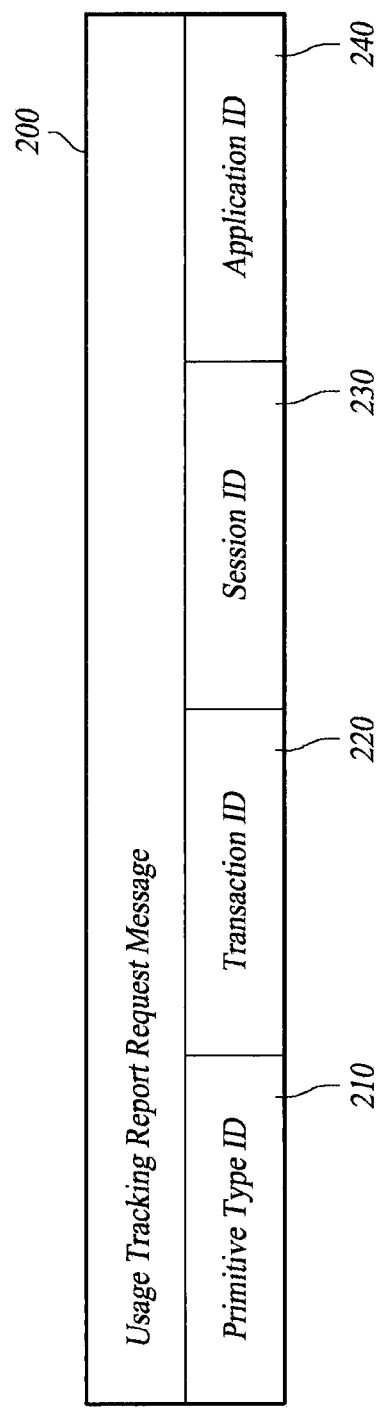
FIG. 2 shows a usage tracking report notification message according to an embodiment of the present invention.

FIG. 2 shows a usage tracking report request message according to an embodiment of the present invention.

The usage tracking report request message shown in FIG. 2 is transmitted from the DCD server 20 to the DCD client 10 to inform the terminal that the DCD server 20 will collect content usage information in the usage tracking report request step S100 described with reference to FIG. 1.

Referring to FIG. 2, the usage tracking report request message 200 may include at least one of information regarding a primitive type ID 210 for identifying the message type, information regarding a transaction ID 220 used as an identifier of a message transaction, information regarding a session ID 230 used as an identifier of a session during which the corresponding message transaction occurs, and information regarding an application ID 240 used as an identifier of the application expressing contents used by the terminal.

After receiving the usage tracking report request message 200, the DCD client 10 reads the application ID information 240 included in the usage tracking report request message 200 and extracts channel usage information, content usage information, etc. regarding contents expressed (read or used) by the application corresponding to the application ID. Then, the DCD client 10 creates a usage tracking report message and transmits the message to the DCD server 20.

The primitive type ID 210 within the usage tracking report request message 200 is used to define the message type. For example, a unique ID value corresponding to the usage tracking report request message 200 may be assigned to differentiate the message from others.

The usage tracking report request message 200 may be transmitted from the DCD server to the DCD client at a cycle or event period set by the administrator of the DCD server or set in a program regarding content usage information collection within the DCD server.

Figure 3:
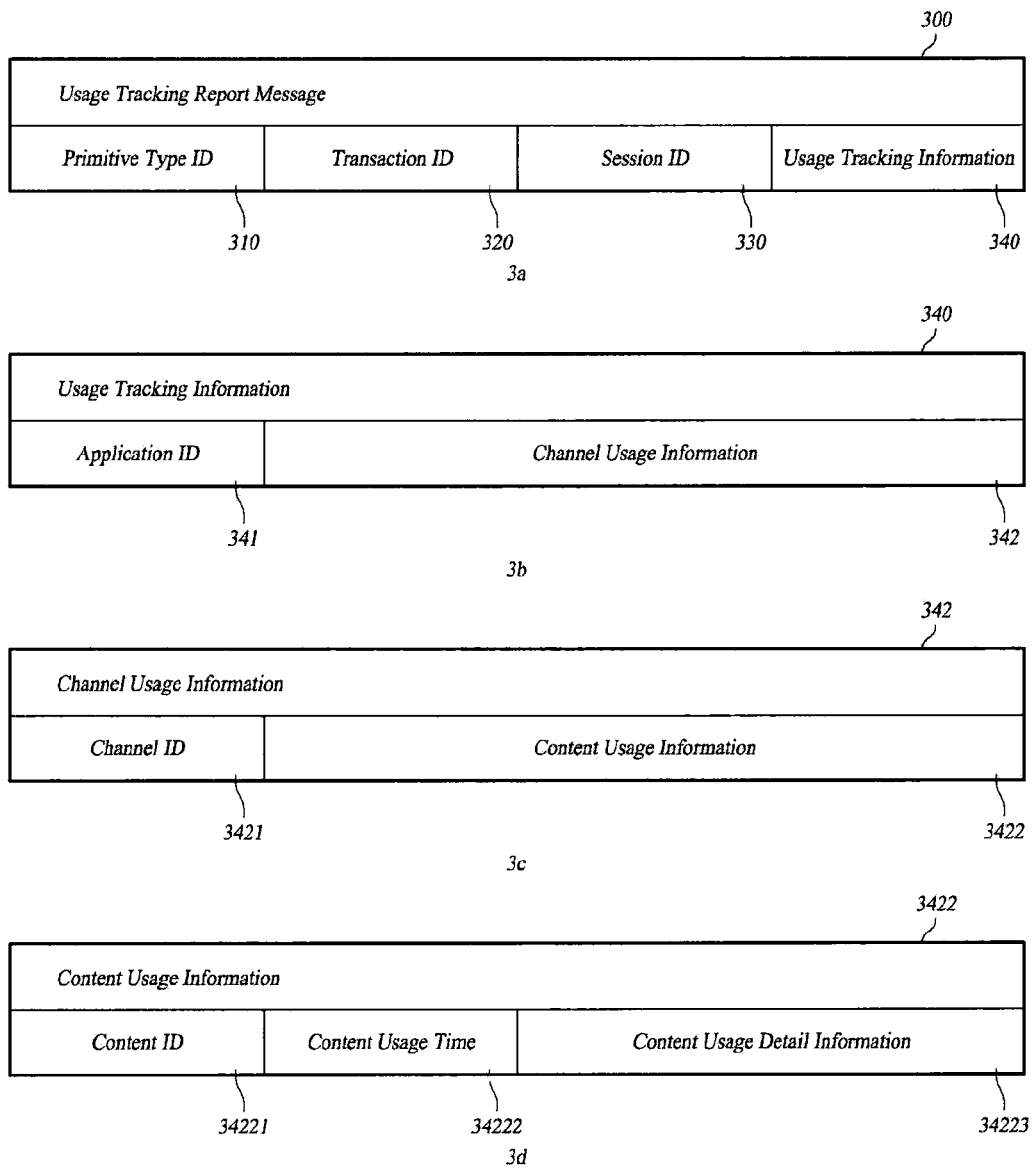
FIG. 3a shows a usage tracking report request message according to an embodiment of the present invention.
FIG. 3b shows a usage tracking information field within a usage tracking report request message according to an embodiment of the present invention.
FIG. 3c shows a channel usage information field within usage tracking information according to an embodiment of the present invention.
FIG. 3d shows a content usage information field within channel usage information according to an embodiment of the present invention.

FIG. 3a shows a usage tracking report message according to an embodiment of the present invention.

The usage tracking report message 300 shown in FIG. 3a is received from the DCD client by the DCD server in the content usage information collection step S102 described with reference to FIG. 1, and is used by the DCD client to report the usage tracking information to the DCD server.

The usage tracking report message 300 includes information regarding a primitive type ID 310 for identifying the message type, information regarding a transaction ID 320 used as an identifier of a message transaction, information regarding a session ID 330 used as an identifier of a session during which the corresponding message transaction occurs, and usage tracking information 340 including information regarding contents actually used by the terminal.

The primitive type ID 310 within the usage tracking report message 300 is used to define the message type. For example, a unique ID value corresponding to the usage tracking report message 300 may be assigned to differentiate the message from others.

The usage tracking information 340 within the usage tracking report message 300 includes information regarding actual content usage reported by the DCD client to the DCD server, and may include application ID information and information regarding usage of a channel containing the used contents. The usage tracking information 340 will be described later with reference to FIG. 3*c*.

FIG. 3*b* shows a usage tracking information field within a usage tracking report request message according to an embodiment of the present invention.

FIG. 3*b* shows an example of the usage tracking information 340 field within the usage tracking report message 300 described with reference to FIG. 3*a*. The usage tracking information 340 may include information regarding actual content usage, which is reported by the DCD client to the DCD server.

Referring to FIG. 3*b*, the usage tracking information 340 within the usage tracking report message 300 may include information regarding an application ID 341 used as an identifier of an application expressing contents used by the terminal, and channel usage information 342 including information regarding usage of a channel containing contents expressed by the application.

The application ID 341 information is related to the application ID included in the usage tracking report request message 200 transmitted by the DCD server in the usage tracking report request step S100 described with reference to FIG. 1. This information is used to collect content usage information regarding contents expressed (used) by the application corresponding to the application ID 341. Contents may be contained in a specific channel, and one channel can contain at least one piece of contents. An application can express contents contained by at least one channel.

Therefore, collection of content usage information regarding contents expressed by a specific application ID 341 corresponds to collection of, for example, an application ID, channel usage information, and content usage information.

The channel usage information 342 may include channel ID list information listing the ID of channels including contents expressed by the application corresponding to the application ID 341.

FIG. 3*c* shows a channel usage information field within usage tracking information according to an embodiment of the present invention.

The channel usage information 342 field shown in FIG. 3*c* exists in the usage tracking information 340 within the usage tracking report message 300.

Referring to FIG. 3*c*, the channel usage information 342 field may include channel ID 3421 information including information regarding the ID of a channel containing contents expressed by the application corresponding to the application ID included in the usage tracking report request message 200, and content usage information 3422 including information regarding usage of contents contained by a channel corresponding to a specific channel ID on the channel ID field.

The content usage information 3422 may include information regarding the ID list of contents contained in a specific channel ID.

FIG. 3*d* shows a content usage information field within channel usage information according to an embodiment of the present invention.

The content usage information 3422 field shown in FIG. 3*d* exists in channel usage information 342 within usage tracking information 340 within the usage tracking report message 300.

Referring to FIG. 3*d*, the content usage information 3422 may include content ID information 34221 regarding contents contained by a channel corresponding to a specific channel ID, content usage time information 34222 regarding the time of usage of contents corresponding to the content ID, and content usage detail information 34223 including information regarding detailed usage of contents corresponding to the content ID. The content usage time information 34222 may include at least one of initial content usage time information, final content usage time information, and usage duration information. The initial content usage time information may indicate the time of first access to corresponding contents. That is, the initial content usage time information may be timestamp information regarding when content is first accessed.

The content usage detail information 34223 is defined in advance between the CP, which stores contents, and the application within the terminal, which expresses contents, and may include information regarding the number of times of content usage. The information regarding the number of times of content usage may indicate the number of times of access to corresponding contents. That is, the content usage detail information may include usage-count information regarding the number of times content is accessed.

Figure 4:
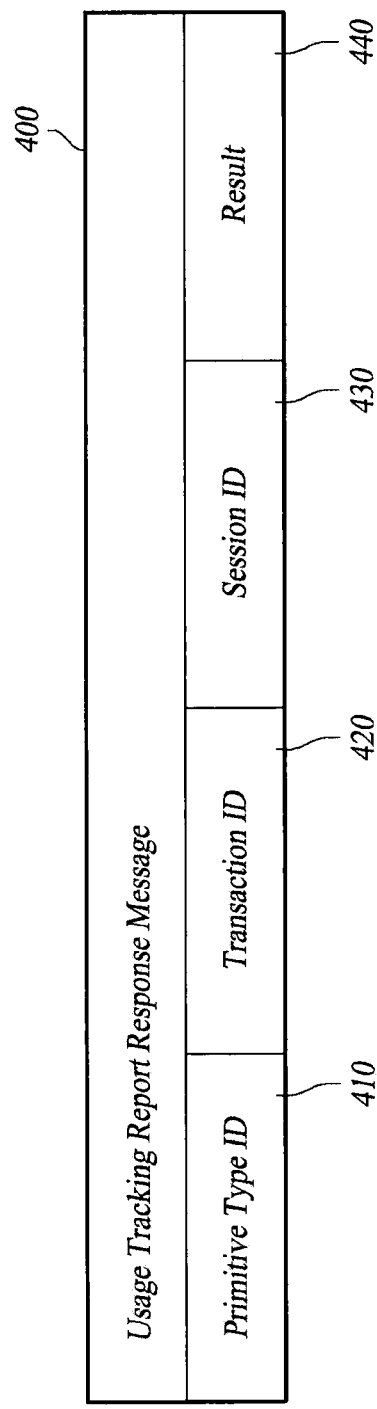
FIG. 4 shows a usage tracking report response message according to an embodiment of the present invention.

FIG. 4 shows a usage tracking report response message according to an embodiment of the present invention.

Referring to FIG. 4, the usage tracking report response message 400 is a response to the usage tracking report message 300 received by the DCD server from the DCD client.

Referring to FIG. 4, the usage tracking report response message 400 may include information regarding a primitive type ID 410 for identifying the message type, information regarding a transaction ID 420 used as an identifier of a message transaction, information regarding a session ID 430 used as an identifier of a session during which the corresponding message transaction occurs, and result 440 information including result information regarding the usage tracking report message.

The primitive type ID 410 within the usage tracking report response message 400 is used to define the message type. For example, a unique ID value corresponding to the usage tracking report response message 400 may be assigned to differentiate the message from others.

The result 440 information includes information regarding the result of collecting content usage information through the usage tracking report message 300 received from the DCD client. The result 440 information is set to a unique value corresponding to successful collection when the DCD server successfully collects content usage information through the usage tracking report message 300 from the DCD client. The result 440 information is set to a unique value corresponding to collection failure or the reason of collection failure when the collection fails. For example, in the case of successful collection, the usage tracking report response message 400 is transmitted to the DCD client with the result information 440 field set to no. 0; in the case of collection failure due to grammatical errors, the usage tracking report response message 400 is transmitted to the DCD client with the result information 440 field set to no. 1; and, in the case of collection failure due to absence of content in the usage tracking report message 300, the usage tracking report response message 400 is transmitted to the DCD client with the result information 440 field set to no. 2.

Figure 5:
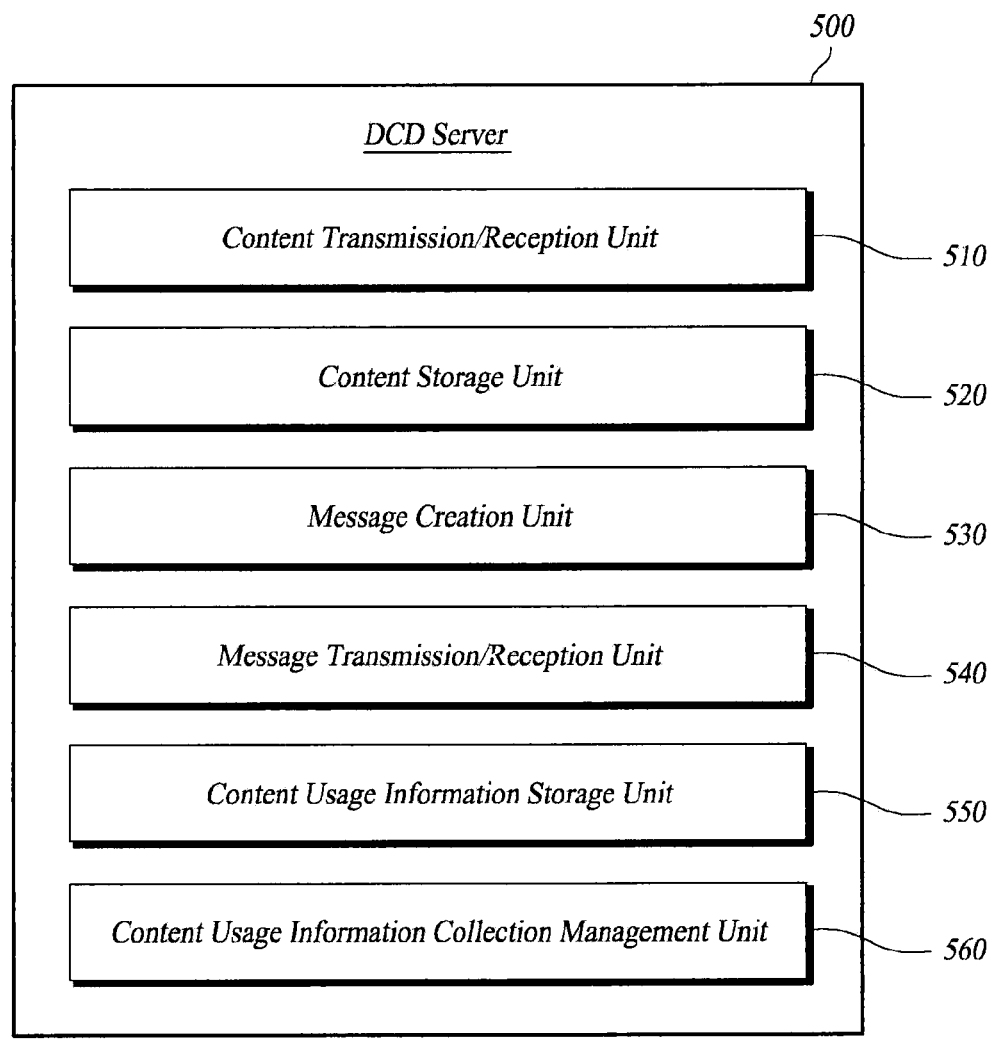
FIG. 5 shows the construction of a DCD server adapted to collect content usage information according to an embodiment of the present invention.

FIG. 5 shows the internal construction of a DCD server adapted to collect content usage information according to an embodiment of the present invention.

Particularly, FIG. 5 shows the internal construction of a DCD server adapted to interwork with a DCD client within a terminal to collect content usage information.

Referring to FIG. 5, the DCD server 500 includes a content transmission/reception unit 510, a content storage unit 520, a message creation unit 530, a message transmission/reception unit 540, a content usage information storage unit 550, and a content usage information collection management unit 560.

The content transmission/reception unit 510 is adapted to receive contents from a CP, which stores contents, and transmit the contents to the DCD client within the terminal.

The content storage unit 520 is adapted to store contents received by the content transmission/reception unit.

The message creation unit 530 is adapted to create a usage tracking notification message and a usage tracking report response message, which are necessary to collect content usage information from the DCD client.

The message transmission/reception unit 540 is adapted to transmit a usage tracking notification message to the DCD client to collect content usage information, to receive a usage tracking report message from the DCD client to receive a usage tracking report, and to transmit a usage tracking report response message in response to the usage tracking report message.

The content usage information storage unit 550 is adapted to collect content usage information from the DCD client and store the information.

The content usage information collection management unit 560 is adapted to manage the collection of content usage information regarding contents used by the terminal from the DCD client, and to instruct the message creation unit to create a usage tracking notification message for staring collection.

The content usage information stored in the content usage information storage unit mentioned above can be transmitted by the message transmission/reception unit at a request of the CP to provide contents.

Although several exemplary embodiments of the present invention have been described for illustrative purposes, those skilled in the art will appreciate that various modifications, additions and substitutions are possible, without departing from the scope and spirit of the invention as disclosed in the accompanying claims.

INDUSTRIAL APPLICABILITY

As mentioned above, the present invention is advantageous in that the DCD server collects content usage information so that users are provided with highly-preferred contents.

The fact that the DCD server collects content usage information and transmits no contents unnecessary to users avoids wasting the network bandwidth and improves content delivery efficiency of the terminals, CP, and DCD server.

The invention claimed is:

1. A method for collecting information on prior usage of content used by a Terminal at a DCD (Dynamic Content Delivery) server from the Terminal, the method comprising the steps of:
    transmitting a Usage Tracking Report Message from a DCD client installed in the Terminal to the DCD server; and
    receiving the Usage Tracking Report Message at the DCD server,
    wherein the Usage Tracking Report Message includes first information for identifying a corresponding session, second information including a transaction identifier, third information for identifying an application which expresses the content used by the Terminal and fourth information including Channel-ID information for identifying a channel containing the content used by the Terminal and content usage information.

2. The method as claimed in claim 1, wherein the content usage information contained in the Usage Tracking Report Message comprises at least one of Content-ID information for identifying the content used by the Terminal and content usage time information relating to content usage time and content usage detail information relating to content usage tracking.

3. The method as claimed in claim 2, wherein the content usage time information includes timestamp information regarding when the content used by the Terminal is first accessed.

4. The method as claimed in claim 2, wherein the content usage detail information includes usage-count information regarding the number of times the content used by the Terminal is accessed.

5. The method as claimed in claim 1, further comprising the steps of:
    transmitting a Usage Tracking Report Request Message from the DCD server to the DCD client of the Terminal; and
    receiving the Usage Tracking Report Request Message in the DCD client.

6. The method as claimed in claim 5, wherein the Usage Tracking Report Request Message includes at least one of Session-ID information for identifying a corresponding session, information including Transaction ID information, and Application-ID information for identifying a corresponding application.

7. A system for collecting information on prior usage of content used by a Terminal at a DCD (Dynamic Content Delivery) server from the Terminal, the system comprising:
    the terminal including a DCD client which transmits a Usage Tracking Report Message; and
    the DCD server receiving the Usage Tracking Report Message,
    wherein the Usage Tracking Report Message includes first information for identifying a corresponding session, second information including a transaction identifier, third information for identifying an application which expresses the content used by the Terminal and fourth information including Channel-ID information for identifying a channel containing the content used by the Terminal and content usage information.

8. The system as claimed in claim 7, wherein the content usage information contained in the Usage Tracking Report Message comprises at least one of Content-ID information for identifying the content used by the Terminal content usage time information relating to content usage time and content usage detail information relating to content usage tracking.

9. The system as claimed in claim 8, wherein the content usage time information includes timestamp information regarding when the content used by the Terminal is first accessed.

10. The system as claimed in claim 8, wherein the content usage detail information includes usage-count information regarding the number of times the content used by the Terminal is accessed.

11. The system as claimed in claim 7, wherein the DCD server transmits a Usage Tracking Report Request Message to the DCD client of the Terminal.

12. The system as claimed in claim 11, wherein the DCD client of the terminal receives the Usage Tracking Report Request Message and transmits the Usage Tracking Report Message to the DCD server based on the received Usage Tracking Report Request Message.

13. The system as claimed in claim 11, wherein the Usage Tracking Report Request Message includes at least one of Session-ID information for identifying a corresponding session, information including Transaction ID information, and Application-ID information for identifying a corresponding application.

14. A method for collecting information on prior usage of content used by a Terminal and transmitting the information on prior usage to a DCD (Dynamic Content Delivery) server, the method comprising the steps of:

generating a Usage Tracking Report Message; and transmitting the Usage Tracking Report Message by the DCD client installed in the Terminal to the DCD server;

wherein the Usage Tracking Report Message includes first information for identifying a corresponding session, second information including a transaction identifier, third information for identifying an application which expresses the content used by the Terminal and fourth information including Channel-ID information for identifying a channel containing the content used by the Terminal and content usage information.

15. The method as claimed in claim 14, wherein the content usage information contained in Usage Tracking Report Message comprises at least one of Content-ID information for identifying the content used by the Terminal and content usage time information relating to content usage time and content usage detail information relating to content usage tracking.

16. The method as claimed in claim 15, wherein the content usage time information includes timestamp information regarding when the content used by the Terminal is first accessed.

17. The method as claimed in claim 15, wherein the content usage detail information includes usage-count information regarding the number of times the content used by the Terminal is accessed.

18. The method as claimed in claim 14, further comprising the step of:

receiving a Usage Tracking Report Request Message transmitted from the DCD server in the DCD client, wherein the DCD client of the terminal transmits the Usage Tracking Report Message to the DCD server based on the received Usage Tracking Report Request Message.

19. The method as claimed in claim 18, wherein the Usage Tracking Report Request Message includes at least one of Session-ID information for identifying a corresponding session, information including Transaction ID information, and Application-ID information for identifying a corresponding application.

20. A non-transitory computer-readable recording medium storing a program for realizing a function for collecting information on prior usage of content used by a Terminal including a DCD client, the computer-readable recording medium comprising:

a function for transmitting a Usage Tracking Report Message from the DCD client of the Terminal to the DCD server; and a function for receiving the Usage Tracking Report Message in the DCD server, wherein the Usage Tracking Report Message includes first information for identifying a corresponding session, second information including a transaction identifier, third information for identifying an application which expresses the content used by the Terminal and fourth information including Channel-ID information for identifying a channel containing the content used by the Terminal and content usage information.

21. The non-transitory computer-readable recording medium as claimed in claim 20, wherein the content usage information includes at least one of Content-ID information for identifying the content used by the Terminal, content usage time information relating to content usage time, and content usage detail information relating to content usage tracking.

22. The non-transitory computer-readable recording medium as claimed in claim 21, wherein the content usage time information includes timestamp information regarding when the content used by the Terminal is first accessed.

23. The non-transitory computer-readable recording medium as claimed in claim 21, wherein the content usage detail information includes usage-count information regarding the number of times the content by the Terminal is accessed.

24. The non-transitory computer-readable recording medium as claimed in claim 20, further comprising:

a function for transmitting a Usage Tracking Report Request Message from the DCD server to the DCD client of the Terminal; and a function for receiving the Usage Tracking Report Request Message in the DCD client.

25. The non-transitory computer-readable recording medium as claimed in claim 24, wherein the Usage Tracking Report Request Message includes at least one of Session-ID information for identifying a corresponding session, information including a Transaction ID information, and Application-ID information for identifying a corresponding application.

* * * * *